Aug. 26, 1969  R. B. HORSFALL ET AL  3,462,817
PRESTRESSED SHEETS FOR SUPPORTING MEMBERS
Filed March 31, 1967  4 Sheets-Sheet 1

INVENTORS
ROBERT B. HORSFALL
WILLIAM A. FARRAND
BY NORMAN E. MARCUM

Robert G. Rogers
ATTORNEY

Aug. 26, 1969 R. B. HORSFALL ET AL 3,462,817
PRESTRESSED SHEETS FOR SUPPORTING MEMBERS
Filed March 31, 1967 4 Sheets-Sheet 2

INVENTORS
ROBERT B. HORSFALL
WILLIAM A. FARRAND
BY NORMAN E. MARCUM

*Robert G. Rogers*
ATTORNEY

INVENTORS
ROBERT B. HORSFALL
WILLIAM A. FARRAND
NORMAN E. MARCUM
ATTORNEY

INVENTORS
ROBERT B. HORSFALL
WILLIAM A. FARRAND
BY NORMAN E. MARCUM

ATTORNEY

United States Patent Office 3,462,817
Patented Aug. 26, 1969

3,462,817
PRESTRESSED SHEETS FOR SUPPORTING MEMBERS
Robert B. Horsfall, Placentia, William A. Farrand, Fullerton, and Norman E. Marcum, Laguna Beach, Calif., assignors to North American Rockwell Aviation Corporation, a corporation of Delaware
Filed Mar. 31, 1967, Ser. No. 627,392
Int. Cl. B21h 1/02; B21k 1/32
U.S. Cl. 29—116                                      14 Claims

ABSTRACT OF THE DISCLOSURE

Supports composed of sheets of relatively thin material prestressed in tension between comparatively rigid central and peripheral members. Sheets or discs of conoidal form singly or in pairs provide support in the direction of the conoidal axis in addition to providing radial support. The optimum shaping of these discs departs from a simple cone for any finite hub diameter.

CROSS REFERENCE TO RELATED PATENT

Patent No. 3,359,549 for a Random Access Magnetic Disc File Assembly issued on Dec. 19, 1967 to W. A. Farrand et al.

BACKGROUND OF THE INVENTION

Field of the invention

The invention relates to supports comprised of relatively thin sheets of lightweight prestressed material, and more specifically, to configurations comprising pairs of conoidal discs for supporting precision members. At least one pair of such conoidal discs may be combined with at least one flat disc for providing a practical approximation to a true kinematic support.

Description of prior art

A search disclosed analogous art primarily in the field of vehicle wheels. However, no art was discovered which truly anticipates the present invention.

Patent No. 478,191 to A. C. Hide covering a wheel for velocipedes shows a conical sheet wheel construction. However, the novelty is in the use of thickened edges at the hub and rim of the sheets. Hide does not teach or show prestressing of the sheets nor the use of his structure for non-wheel application, and therefore does not anticipate the present invention in any particular.

Patent No. 1,351,052 to MacBeth for a vehicle wheel shows a spoked wheel using compressive loading of the spokes. The primary object of the invention was to provide an improved means for disengaging the wheel rim from the wheel rather than providing a preload for improving the stiffness to weight ratio. Compressive loading requires the use of relatively thick and stiff material. Use of spokes eliminates the possibility of having principle stresses along straight lines tangential to the hub members. In both respects, the patent is directly opposite to the present invention.

Patent No. 3,174,152 to W. R. Maclay for a Magnetic Drum teaches using sheet metal techniques in the manufacture of high precision rotary magnetic memory drums. End sections of generally conical form are secured to the drum for providing additional support. However, the cone members are not prestressed sheets, nor do they approximate an elastic curve. The patent, therefore, does not anticipate the present invention in any particular.

Patent No. 1,627,953 to E. W. Buquet for a method of constructing metal wheels appears to be the closest prior art. It teaches the use of two metal sheets connected at their peripheries and separated at their centers to form a vehicle wheel. It also teaches tensile stressing of these sheets by separating hub members or forcing rim members together. However, Buquet emphasizes the use of grooved ribs in the metal sheets as an essential part of his invention and describes their purpose as providing means for assuring a true conical form of the final wheel element. His teaching implies that such a true conical form is optimum for purposes of constructing such wheels and that stiffness of the sheet itself is of importance.

The present invention is novel relative to Buquet in the recognition of (1) the form of the optimum conoidal shape as a ruled surface corresponding to purely elastic deformation of a flat sheet; (2) the value of prestressed flat or conoidal disc members singly or in combination for supporting structures other than vehicle wheels; (3) the conditions which determine optimum sheet prestress levels for a given application; and (4) the effectiveness of support being independent of the inherent stiffness of the sheet, thus requiring no radial stiffeners.

None of the art disclosed by the search teaches or shows the advantage of using tensilely prestressed sheets whose form approximates that of the elastically deformed surface of a flat sheet wherein, as in the case of circular elements, the surface may be thought of as being generated by a straight line tangent to the hub cylinder and contacting the circular rim. None of the art shows or teaches the use of the inverted form in which the rims of the conoidal members are separated and the sheets are close together or in contact at the hub. The use of such conoidal members in cooperation with flat prestressed discs for overall approximation to kinematic support of a structure is not shown.

The distinctions between the prior art and the invention described herein are summarized as follows: (1) the prestress level in the sheet material is less than the elastic limit of the sheet material and greater than any anticipated dynamic loading stress, so that no anticipated load can completely remove prestress from a sheet; (2) the relatively rigid hub and rim members are interconnected by the sheet member and counteract the radial component of the sheet prestress; (3) the sheet form may be comprised of either a flat or conoidal configuration. In the latter case the shape is a practical approximation to the form which would be assumed by an ideally elastic membrane supported between the given hub and rim members. Such an approximation may include the surface of a true right circular cylinder.

For purposes of definition, a kinematic support is one which provides those and only those constraints needed to restrict motion of the supported member to the desired degrees of freedom. It thus eliminates unpredicted stresses and strains in the supported member which might result from opposing support forces if extra constraints were imposed.

For purposes of this description the word "conoid" and its derivatives is used to refer to any shape approximating the surface of revolution generated by a straight line or curve whose chord does not make a right angle with the axis of revolution. In other words, it is a surface of generally conical form but not limited to either a true cone or a surface generated by rotation of a conic section. For non-circular sheets it includes surfaces departing from a true surface of revolution.

SUMMARY OF THE INVENTION

Briefly, the basic embodiment of the invention comprises a single sheet of relatively thin material interconnecting a comparatively rigid rim member and a comparatively rigid hub member. This sheet is connected between the hub and rim members so that it is prestressed in tension to a level below the elastic limit of the material such that any expected load applied to it by the structure of which it forms a supporting element is insufficient to increase stress beyond the elastic limit in, or to remove the tensile stress from, any portion of the sheet.

A prestressed sheet meeting the criteria described above provides substantially increased stiffness of support relative to a sheet of the same material and dimensions without the prestress. In fact, to the extent that the elasticity of the sheet is linear, the increase in stiffness is substantially 2 to 1.

The sheet may be circular or non-circular and either flat or of conoidal form. A flat prestressed disc provides excellent support in a radial direction (in the plane of the sheet) but is relatively flexible in an axial direction (normal to the plane of the sheet) and in twist about an axis lying in the sheet. Where such properties are advantageous, the flat disc is a useful supporting element.

In the conoidal case, the optimum configuration is that assumed by a completely elastic sheet connecting the hub and the rim under tensile prestress. Furthermore, in the conoidal form other members must be supplied to oppose the axial resultant of the prestress in the sheet member. The shape assumed by an elastic sheet which has been described as the optimum form for a conoidal member is one in which the lines of principal stress are straight lines tangent to the hub member. Therefore, this shape may be described in geometrical terms as a ruled surface. Only if the hub reduces to a point does this surface degenerate into a true cone. However, if the hub is relatively small in diameter compared to the rim diameter, a true cone may be an adequate practical approximation to the optimum surface form.

A second conoidal sheet with its axial displacement in a direction opposite from the first may be used to supply a force which opposes the resultant axial force previously described. Prestress may be applied to the pair by forcing a displacement of the hub members relative to the rim members in the direction tending to increase the height of the conoidal elements.

In one embodiment the present invention may be used as a member for supporting a rotating device and for comprising a portion of the rotating element. As a portion of the rotating element, the minimum requirement for complete constraint to an axis of rotation is one pair of conoidal members with opposed axial preloads. If the rotating member is short, the two conoidal members may be substantially in contact at their peripheries and separated at their hubs to form the support or end bell element of the rotating member. The hub must then be supported on a suitable bearing to provide the necessary radial, axis and torsional stiffness. If the rotating member is relatively long, the two conoidal sheets may be located at either end of the rotor and be mounted on bearing which can maintain the necessary axial preload.

Because of possible changes in prestress due to dimensional changes resulting from such influences as temperature differences or gradients, the described support is not ideal for a precision device. A preferred embodiment comprises an opposed pair of conoidal discs at one end of the long rotor similar to that described in connection with the short rotor application, supplemented by a flat sheet at the opposite end. Such a configuration provides more definite axial location of the rotor with reference to the double conoid end and permits relative dimensional change in the axial direction to be absorbed in the flexure of the flat sheet. In other embodiments, a plurality of disc pairs may be combined for supporting a rotatable member. In addition, other sheets may be added to the hub and rim members so that discs comprising three or more prestressed sheets may be provided as support members. In such embodiments, the hub and/or rim members may require more changes in order to accommodate the plurality of sheets.

An alternative configuration of a pair of conoidal elements reverses their relative location so that they are substantially in contact at the hub and separated at their peripheries. Other factors being equal, the configuration provides substantially the same stiffness against radial and axial deflection as the rim together configuration combined with somewhat greater flexibility about an axis lying in the bisecting plane. In combination with a flat diaphragm at the opposite end, such an inverted conoidal element may serve to define accurately the axis of a shaft without applying a material bending stress thereto. Furthermore, in combination with a rotor of the above described preferred form, such a shaft support can provide a close approximation to kinematic support of the rotating member, together with minimum overall length for a given degree of stiffness due to the "nesting" properties of the oppositely configured conoidal assemblies. In other words, the shapes of the assemblies mate together.

Therefore, it is an object of this invention to provide a relatively lightweight structural element for support of fixed or roating devices.

It is another object of this invention to provide a mechanical support member depending on proper distribution of prestress in a sheet to provide an optimum stiffness to weight ratio for constraint of predetermined degrees of freedom.

It is still a further object of this invention to provide a structural support member comprising a pair of prestressed conoidal discs whose prestress is maintained by opposed relative axial displacement of their hubs and rims.

A still further object of this invention is to provide a combination of prestressed conoidal and flat members for optimum support of a rotating device.

A still further object of this invention is to provide a relatively light combination of conoidal and flat sheet member for providing an approximate kinematic support.

These and other objects of this invention will become more apparent is connection with the following drawings.

DESCRIPTION OF THE PREFERRED EMBODIMENTS

Figure 1:
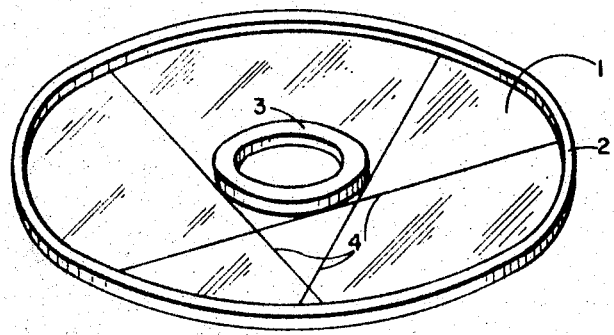
FIGURE 1 illustrates typical principal stress lines in a flat disc loaded between a central hub member and a rim member.

FIGURE 1 shows a basic embodiment comprising flat disc support element 1 connected under tensile prestress between (peripheral) rim element 2 and (central) hub element 3. Lines 4 indicate the directions of principal stress in the sheet. Prestress in a flat sheet configuration of this type may be provided by a mechanical drawing process which is analogous to the stretching of a conventional drum head. The prestress may also be applied by bonding material of appropriately different thermal expansion coefficients at high temperature such that on cooling the relative shrinkage loads the sheet, or by other methods obvious to one skilled in the art.

Figure 2:
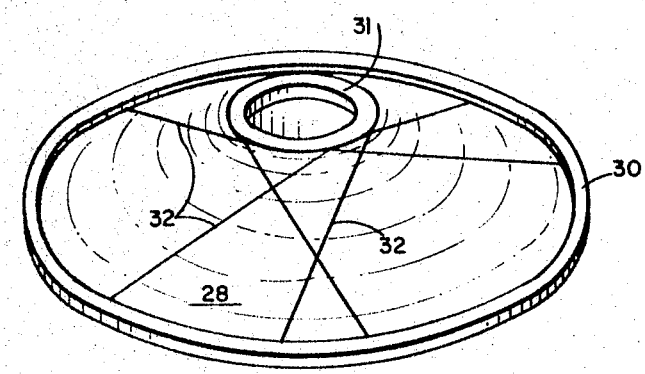
FIGURE 2 illustrates a similar distribution of principal stress lines on conoidal discs similarly loaded.

FIGURE 2 shows an embodiment of conoidal disc form 29 comprising a relatively thin sheet of material 28 similarly preloaded between rim 30 and hub 31 members with the lines 32 of principal stress again indicated. It will be noted that the lines of principal stress in this case are tangent to the cylindrical surface representing the hub but that the lines joining a given point on the hub to different points on the rim are not collinear. Therefore, the resultant of the stress elements represented by these stress lines is in an axial direction.

Figure 3:
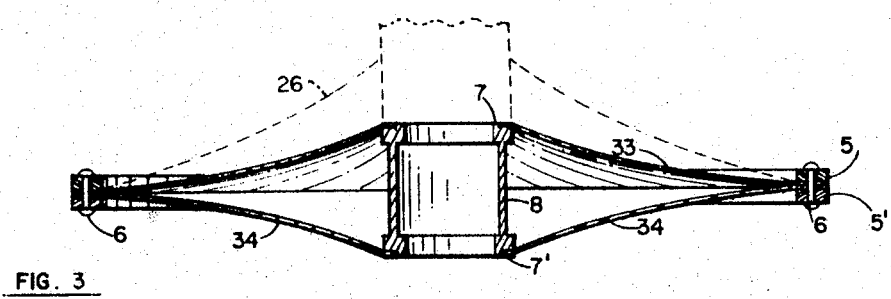
FIGURE 3 illustartes a cross section of a pair of conoidal discs with rims together and hubs separated.

FIGURE 3 shows a cross section of a pair of sheets 33 and 34 forming a conoidal disc similar to the FIGURE 2 embodiment in combination on a single axis with their peripheries in contact and their hub edges separated. Rim members 5 and 5' are connected by a suitable means represented in the figure as rivets 6. Hub members 7 and 7' are separated by spacer 8. The tensile prestress in the sheets is opposed by tension in the spacer and compression in the rim members. At least one additional prestressed sheet 26, shown by the dashed lines, may be connected between the hub and rim members for increasing the support provided by the disc. In other embodiments additional sheets may be added.

Figure 4:
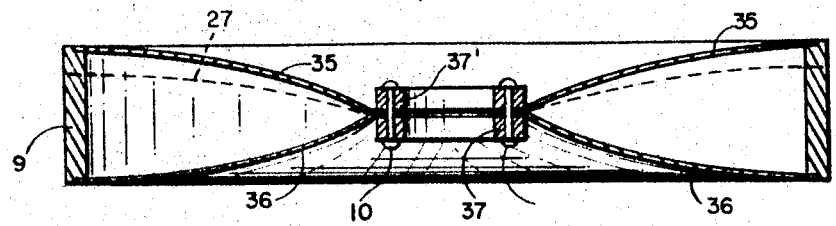
FIGURE 4 illustrates a cross section of the inverse form in which the hub members are in contact and the rims are separated.

FIGURE 4 shows a cross section of an alternate configuration of paired sheets 35 and 36 in which the peripheries are separated and the hub edges 37 and 37' are in contact. In the FIGURE 4 embodiment the sheets are directly attached to rim spacer member 9. However, the sheets may be attached to separate rims held apart by a spacer in a manner similar to that illustrated in FIGURE 3 for the hub elements. The tensile prestress in the sheets is opposed by compression in the rim spacer member and tension in hub 37 joining means herein shown as rivets 10. As indicated in connection with FIGURE 3, at least one additional prestressed sheet 27, shown by the dashed lines, may be connected between the hub and rim members for increasing the support provided by the disc. In other embodiments, additional sheets may be added.

Figure 5:
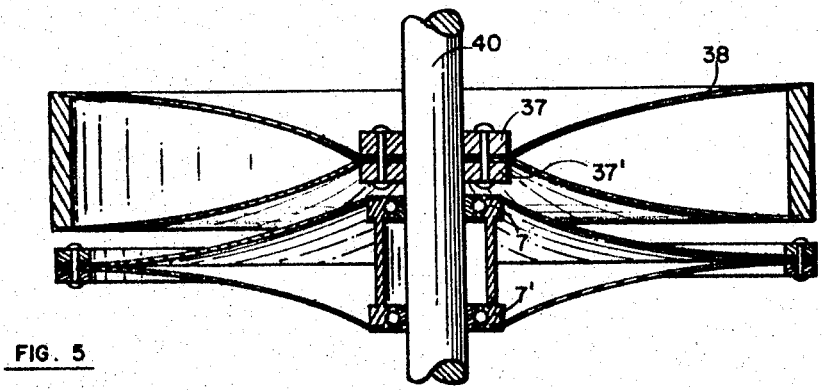
FIGURE 5 illustrates mating capabilities of the FIGURES 3 and 4 configurations for providing optimum compactness.

FIGURE 5 shows an embodiment comprising a combination of disc pair 38 as illustrated in FIGURE 4 and disc pair 39 as illustrated in FIGURE 3. The discs are placed together to minimize the axial length required for support of a rotating member (partially shown as disc pair 39) in both radial and axial directions. In other words, hubs 37 (and 37') and 7 (and 7') are disposed adjacent to each other along a central axis. The combination provides limited flexibility by the "hub adjacent" configuration of pair 38. In other embodiments, additional disc pairs could be combined with the disc pairs shown in FIGURE 5 for increasing the support.

Figure 6:
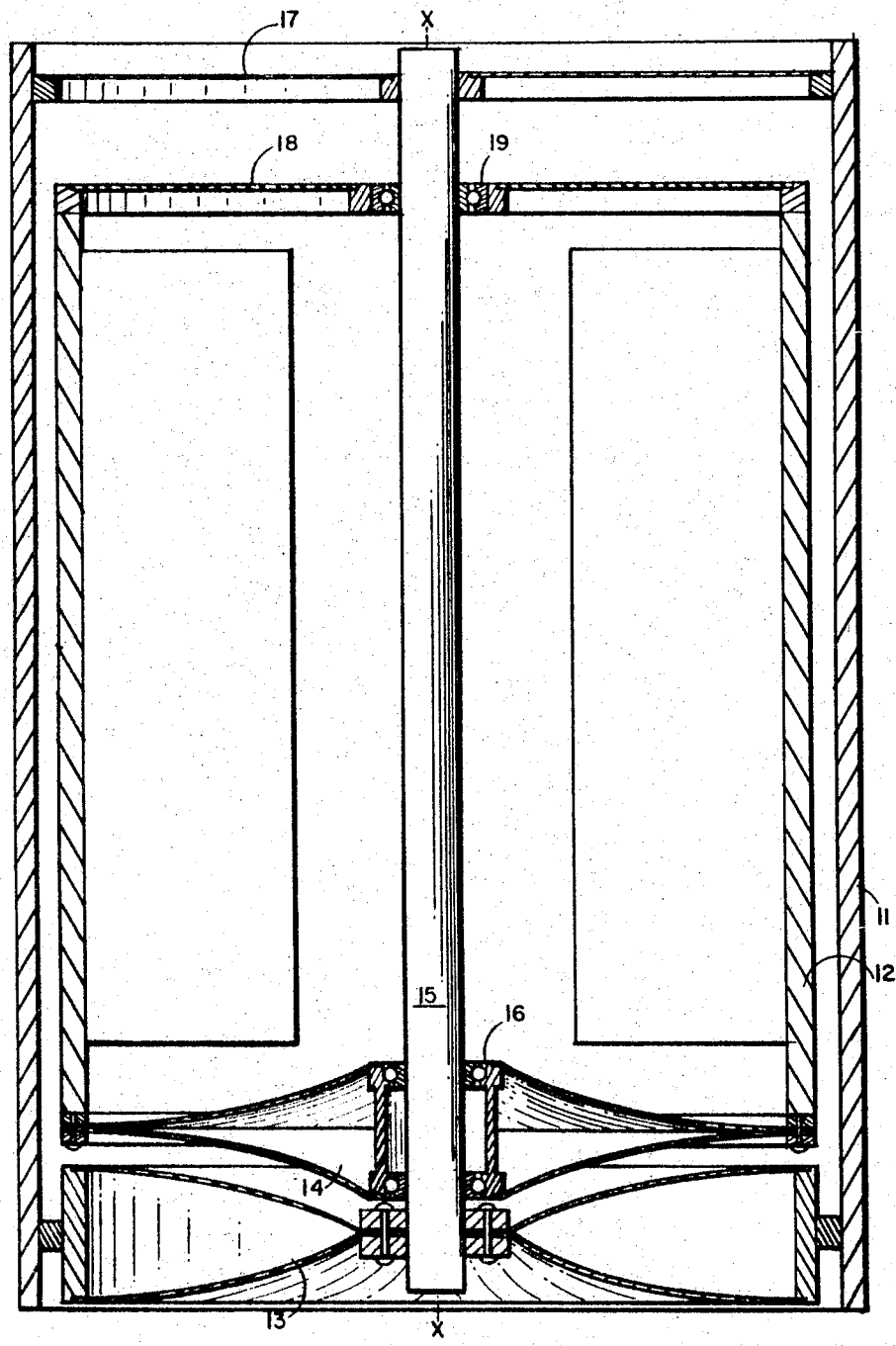
FIGURE 6 illustrates in cross section a preferred embodiment of a combination of flat and conoidal disc form elements for approximating a kinematic support for a relatively long rotating member in a housing.

FIGURE 6 illustrates a cross sectional view of a preferred embodiment of the invention which provides an approximation to kinematic support of a relatively long rotating member. The embodiment includes rotating member 12 disposed within external housing 11. The rotating member may comprise a plurality of recording discs including means for recording on the disc as described in the referenced patent application for a Disc Memory. Details of the rotating member are omitted for clarity, although such details can be seen by referring to the referenced application. The two pairs of conoidal elements (or discs) 13 and 14 provide axial and radial constraint of one end of the rotating member by way of central shaft 15 and bearings 16.

Flat members 17 and 18 provide radial constraint together with some axial flexibility for the other end of the rotating element through bearing 19. Of the total of six degrees of freedom of a rigid body such as rotating member 12, the conoidal combination constrains all three degrees of linear freedom (two radial and one axial). The combination of these elements with flat sheet members 17 and 18 constrains the two degrees of angular freedom of rotation about axes at right angles to rotation axis X—X. The one remaining degree of freedom is that of rotation about axis X—X which is the desired motion of rotating member 12.

Figure 7:
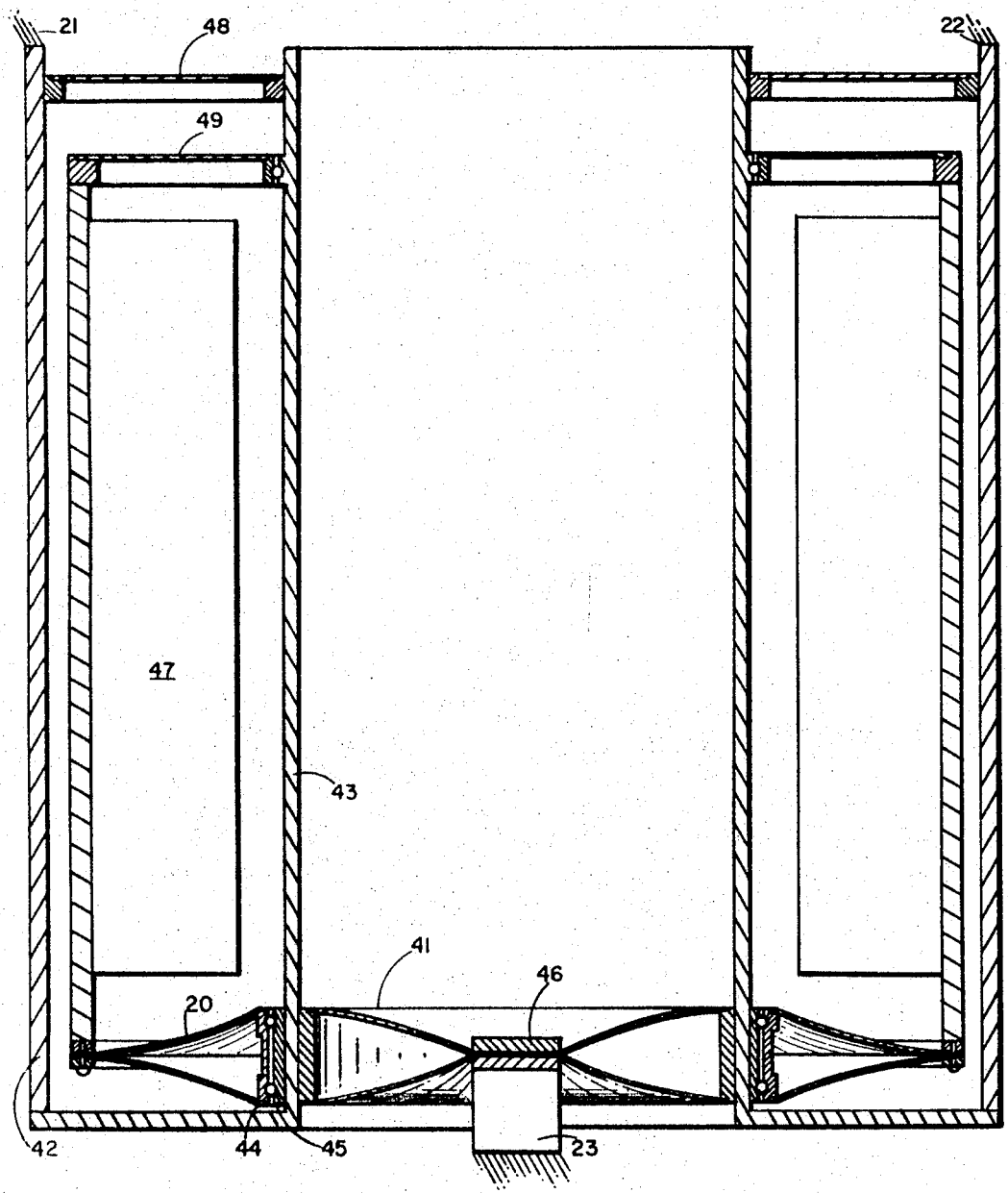
FIGURE 7 illustrates in cross section an alternate preferred embodiment of a combination of flat or conoidal disc elements for approximate kinematic support of a relatively long rotating member in a housing.

FIGURE 7 shows a cross section of an alternate arrangement of the preferred embodiment. Conoidal disc 20 comprises two sheets having their peripheries substantially in contact and their central portions separated, as previously described in connection with FIGURE 3. Conoidal disc 41 comprises two sheets wherein the peripheries are separated and the central areas are substantially in contact as described in connection with FIGURE 4. Central member 44 of disc 20 includes an opening which accommodates hollow central shaft member 43 and the peripheral portion of disc 41. The central member includes bearing means 45 so that the disc can rotate relative to disc 41.

Housing 42 is directly supported on two mounts 21 and 22 and the hollow shaft member is supported at the opposite end through central member 46 connected to a centrally disposed mount 23. Rotating member 47, flat sheet members 48 and 49 are interconnected with the disc and shaft substantially as described in connection with FIGURE 6 and for that reason the details are not repeated in connection with FIGURE 7.

Figure 8:
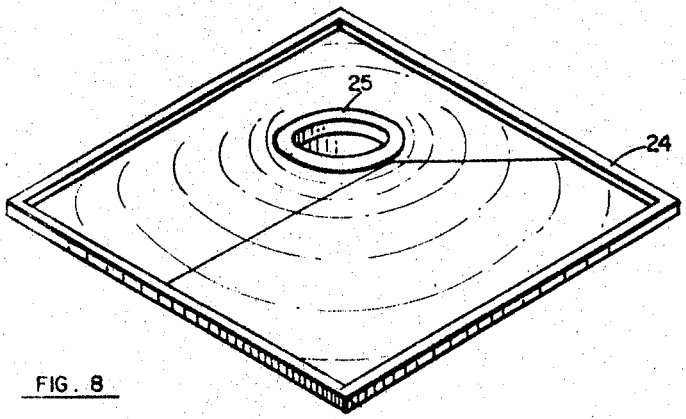
FIGURE 8 illustrates the application of a principle of the invention to non-circular elements.

FIGURE 8 illustrates one example of a non-circular configuration of stressed sheet supporting member wherein the sheet is connected between rectangular (or square) peripheral member 24 and circular or oval hub member 25. In accordance with the spirit of the present invention, the form of this sheet approximates that assumed by a perfectly elastic sheet stretched between the inner and outer members.

Although all the embodiments describe a preferred shape of the sheet members, it shall be understood that practical approximations to this "ideal" form may be used within the spirit of the present invention. The ideal elastic curve must be very closely approximated if the sheets of which these members are comprised are of small thickness to satisfy the required relationships between elastic limit prestress and load. However, load requirements may dictate use of sheet material whose thickness automatically provides a substantial degree of stiffness as a by-product of the thickness required to carry the loads and to satisfy the other criteria. Under these circumstances departures from the ideal form for ease of fabrication may be made if the sheet stiffness is capable of compensating for these departures. Thus, in many cases a practical compromise for easy fabrication may be a sheet of truly conical form prior to application of the prestress. Elastic deformation under prestress modifies the conical form in the direction of the ideal elastic curve to an extent limited by the sheet stiffness. Furthermore, the application of any of the described elements in combination with heavy section structural elements for other functions remains within the scope of the present invention. For example, in the embodiment shown in FIGURE 6, the stationary support structure might be replaced with a solid heavy housing while retaining the sheet form rotating support structure, or vice versa.

We claim:
1. A support member comprising a sheet of relatively thin material,
 a first substantially rigid member centrally disposed with respect to said sheet of material,
 a first substantially rigid member peripherally disposed with respect to said sheet of material, said sheet being connected between said members for placing said sheet of material under tension and for maintaining said tension, said tension being less than the elastic limits of the material and more than the non-destructive loading required to remove said tension.

2. The combination as recited in claim 1, wherein said sheet is substantially flat.

3. The combination as recited in claim 1, wherein said sheet is of substantially conoidal form.

4. The combination as recited in claim 1, wherein the surface of the sheet approximates the shape of a thin elastic membrane stretched between the peripheral and central members.

5. The combination as recited in claim 1, wherein said sheet is substantially conoidal in form, including means interconnecting the peripheral and central members respectively for opposing axial components of said tension in said sheet.

6. The combination as recited in claim 1, wherein at least one additional sheet of relatively thin material is connected between said members under tension whereby a disc comprised of a plurality of sheets is formed.

7. A support member comprising a sheet of relatively thin material,
  a first substantially rigid member centrally disposed with respect to said sheet of material,
  a first substantially rigid member peripherally disposed with respect to said sheet of material, said sheet being connected between said members for placing said sheet of material under tension and for maintaining said tension, said tension being less than the elastic limits of the material and more than the non-destructive loading required to remove said tension,
  means interconnecting the peripheral and central members, respectively, for opposing axial components of said tension in said first recited sheet, said interconnecting means comprising a second sheet of relatively thin material prestressed in tension, said tension being less than the elastic limit of the material and more than the non-destructive loading required to remove the tension, a second substantially rigid member centrally disposed with respect to said second sheet,
  a second substantially rigid member peripherally disposed with respect to the periphery of said second sheet, said second sheet being connected between said members whereby said tension is maintained, and wherein the peripheral members of said first and second sheets are substantially in contact and said central members are separated in an axial direction.

8. The combination as recited in claim 7, wherein said sheets form a disc conoidal in form and wherein a plurality of said discs are combined for supporting a rotatable member.

9. A support member comprising a sheet of relatively thin material,
  a first substantially rigid member centrally disposed with respect to said sheet of material,
  a first substantially rigid member peripherally disposed with respect to said sheet of material, said sheet being connected between said members for placing said sheet of material under tension and for maintaining said tension, said tension being less than the elastic limits of the material and more than the non-destructive loading required to remove said tension,
  means interconnecting the peripheral and central members, respectively, for opposing axial components of said tension in said first recited sheet, said interconnecting means comprising a second sheet of relatively thin material prestressed in tension, said tension being less than the elastic limits of the material and more than the non-destructive loading required to remove the tension, a second substantially rigid member centrally disposed with respect to said second sheet,
  a second substantially rigid member peripherally disposed with respect to the periphery of said second sheet, said second sheet being connected between said members whereby said tension is maintained, and wherein the central members are substantially in contact and the peripheral members are separated in an axial direction.

10. The combination as recited in claim 9, wherein said sheets form a disc conoidal in form and wherein a plurality of said discs are combined for supporting a rotatable member.

11. The combination as recited in claim 9, including a shaft, third and fourth sheets prestressed in tension between a centrally disposed member and a peripherally disposed member for maintaining said tension, said central member including an opening for accommodating said shaft, said third and fourth sheets forming a second disc conoidal in form,
  second flat sheet member means connected between a second centrally disposed member and a second peripherally disposed member, said second centrally disposed member including an opening for accommodating said shaft,
  rotating means disposed about said shaft and rigidly connected to the peripheral members of said third and fourth sheets and to the peripheral member of said second flat sheet.

12. A support member comprising a sheet of relatively thin material,
  a first substantially rigid member centrally disposed with respect to said sheet of material,
  a first substantially rigid member peripherally disposed with respect to said sheet of material, said sheet being connected between said members for placing said sheet of material under tension and for maintaining said tension, said tension being less than the elastic limits of the material and more than the non-destructive loading required to remove said tension,
  a second sheet of relatively thin material having its center connected to said centrally disposed member, and its periphery connected to said peripheral member for placing said sheet in tension and for maintaining said tension, said tension being less than the elastic limits of the material and no more than the non-destructive loading required to remove the tension, said first and second sheets forming a first disc conoidal in form,
  rigid shaft member having one end connected to said central member,
  relatively rigid housing means connected at one end to the periphery of said peripheral member,
  flat sheet member means including a central member and a peripheral member, said sheet means being prestressed in tension between said member, said sheet member being interconnected between the other end of said rigid housing member and the other end of said shaft member, whereby said shaft is substantially contrained in at least five degrees of freedom relative to the housing.

13. A support member comprising a sheet of relatively thin material,
  a first substantially rigid member centrally disposed with respect to said sheet of material,
  a first substantially rigid member peripherally disposed with respect to said sheet of material, said sheet being connected between said members for placing said sheet of material under tension and for maintaining said tension, said tension being less than the elastic limits of the material and more than the non-destructive loading required to remove said tension,
  a second sheet of relatively thin material prestressed in tension, said tension being less than the elastic limits of the material and more than the non-destructive loading required to remove the tension, with the center of said sheet being connected to said centrally disposed member, and with the periphery of said sheet connected to said peripheral member whereby said tension is maintained, said first and second sheets forming a first disc, rigid shaft member having one end connected to said central member, relatively rigid housing means connected at one end to the periphery of said peripheral member, flat sheet member means including a central member and a peripheral member, said sheet means being prestressed in tension between said members, said sheet member being interconnected between the other end of said rigid housing member and the other end of said shaft member, whereby said shaft is substantially constrained in at least five degrees of freedom relative to the housing, further including third and fourth sheets prestressed in tension between a centrally disposed member and a peripherally disposed member for maintaining said tension, said central member including an opening for accommodating said shaft, said third and fourth sheets forming a second disc, second flat sheet member means connected between a second centrally disposed member and a second peripherally disposed member, said second centrally disposed member including an opening for accommodating said shaft, rotating means disposed about said shaft and rigidly connected to the peripheral members of said third and fourth sheets and to the peripheral members of said second flat sheet, and, wherein the peripheries of either of said first and second sheets or said third and fourth sheets are substantially in contact and the peripheries of the other of said sheets are separated, and wherein the central members of either of said first and second sheets or said third and fourth sheets are substantially in contact and the other of said central members are separated, and wherein the sheets having their peripheries substantially in contact have their central members separated.

14. A support member comprising a sheet of relatively thin material,
   a first substantially rigid member centrally disposed with respect to said sheet of material,
   a first substantially rigid member peripherally disposed with respect to said sheet of material, said sheet being connected between said members for placing said sheet of material under tension and for maintaining said tension, said tension being less than the elastic limits of the material and more than the non-destructive loading required to remove said tension,
   a second sheet of relatively thin material prestressed in tension, said tension being less than the elastic limit of the material and more than the non-destructive loading required to remove the tension, with the center of said sheet connected to said centrally disposed member and with the periphery of said sheet connected to said peripheral member whereby said tension is maintained, and wherein the centers of said sheets are substantialy in contact and the peripheries of said sheets are separated in an axial direction,
   a rigid hollow shaft member connected to the periphery of said peripheral member,
   relatively rigid housing means rigidly connected to the periphery of said peripheral member,
   flat sheet member means including a central member and a peripheral member, said sheet means being prestressed in tension between said members and having its peripheral member connected to the other end of said housing means and having its central member connected to the other end of said shaft means,
   third and fourth sheets prestressed in tension between a centrally disposed member and a peripherally disposed member for maintaining said tension, said central member including an opening having a diameter large enough to accommodate the peripheral member of said first and second sheets, with the peripheries of said sheets being substantially in contact and the centers of said sheets being separated in an axial direction,
   second flat sheet member means connected between a second centrally disposed member and a peripherally disposed member, said second centrally disposed member including an opening for accommodating said shaft,
   rotating means disposed about said shaft and within said housing means, said means being rigidly connected at one end to the peripheries of said third and fourth sheets and to the peripheral member of said second sheet.

References Cited

UNITED STATES PATENTS

| 478,191 | 7/1892 | Hide | 301—63 |
| 1,351,052 | 8/1920 | MacBeth | 301—64 |
| 1,627,953 | 5/1927 | Buquet | 29—159.01 |
| 2,844,354 | 7/1958 | Warnken | 161—42 XR |

BILLY J. WILHITE, Primary Examiner

U.S. Cl. X.R.

29—159.01; 161—42; 301—63; 340—174.1